United States Patent [19]

Shinbrot et al.

[11] Patent Number: 4,707,113
[45] Date of Patent: Nov. 17, 1987

[54] DOCUMENT FEEDER FOR MOVING PLATEN COPIERS

[75] Inventors: Troy Shinbrot, Greenbelt, Md.; Youti Kuo, Penfield, N.Y.

[73] Assignee: Xerox Corporation, Stamford, Conn.

[21] Appl. No.: 898,159

[22] Filed: Aug. 19, 1986

[51] Int. Cl.[4] .................... G03G 15/00; B65H 29/46
[52] U.S. Cl. .................... 355/14 SH; 271/84; 271/267; 355/3 SH; 355/8; 355/50
[58] Field of Search ............... 355/3 SH, 14 SH, 8, 355/48, 50; 271/84, 267

[56] References Cited

U.S. PATENT DOCUMENTS

| | | | |
|---|---|---|---|
| 3,888,581 | 6/1975 | Caldwell | 355/64 |
| 3,900,258 | 8/1975 | Hoppner et al. | 355/51 |
| 4,068,949 | 1/1978 | Booth et al. | 355/75 |
| 4,367,947 | 1/1983 | Arter et al. | 355/75 |
| 4,368,977 | 1/1983 | Arter et al. | 355/75 |
| 4,429,866 | 2/1984 | Castro-Hahn | 271/266 |
| 4,530,591 | 7/1985 | Mastuyama | 355/8 |
| 4,647,183 | 3/1987 | Hohjoh | 355/3 SH X |
| 4,660,957 | 4/1987 | Ueda et al. | 355/3 SH |

FOREIGN PATENT DOCUMENTS 0145045 6/1985 European Pat. Off. .
55-133064 10/1980 Japan .

OTHER PUBLICATIONS

"Moving Platen Copier With Document Eject" by Rush, Xerox Disclosure Journal, vol. 4, No. 4, Jul./Aug. 1979, pp. 521–522.

"Document Ejector" by Rauen, Xerox Disclosure Journal, vol. 8, No. 3, May/Jun. 1983, pp. 199–200.

Primary Examiner—Arthur T. Grimley
Assistant Examiner—Jane K. Lau

[57] ABSTRACT

In a copier with a moving platen document imaging system, wherein the platen is a part of a moving platen unit reciprocally driven relative to the stationary body of the copier, with a document on, and moving with, the platen being imaged by the copier in an imaging movement of the moving platen unit, the improvement including an automatic document feeder for automatically feeding documents on to and off of the platen solely utilizing the reciprocal movement of the moving platen unit, including a document feeding system mounted to the moving platen unit for reciprocal movement therewith but rotatable relative to the platen for movement of documents relative to the platen, and a motion converting system for mechanically converting the reciprocal motion of the moving plate unit in at least one direction of movement thereof into appropriate intermittent rotation of the document feeding system for intermittently rotatably driving the document feeding system at a document feeding velocity substantially different from the reciprocal movement velocity of the moving platen unit, so as to feed a document on to and over the platen while the platen is reciprocally moving, and a system for automatically disengaging the document feeding system from the motion-converting system for holding a document on the platen without relative movement between the document and the platen during the imaging movement of the document and the platen.

9 Claims, 7 Drawing Figures

DOCUMENT FEEDER FOR MOVING PLATEN COPIERS

The present invention relates to an improved document sheet handler for a moving platen type copier, in which document feeding is provided compactly and with lower cost by utilizing the platen movement.

The art of original document sheet handling for copiers has been intensively pursued in recent years. Various systems have been provided for automatic or semi-automatic feeding of document sheets to be copied to and over the imaging station of the copier. The documents are normally fed over the surface of a transparent platen into a registered copying position on the platen, and then off the platen. Such automatic or semiautomatic document handlers eliminate the need for the operator to place and align each document on the platen by hand. This is a highly desirable feature for copiers. Document handlers also enable the full utilization or productivity of higher speed copiers, which cannot reliably be fed documents manually as fast as they can be copied. Lower cost, more compact, and lighter weight document handlers are particularly desired. This is especially true in the normal arrangement in which the document feeder is a part of and/or provides a repositionable (liftable) platen cover overlying the copier platen.

Various of the difficulties and problems in original document sheet handling are discussed in further detail in the references cited herein. These problems are much greater than for copy sheet feeding in many respects. Even related sets of original document sheets may vary considerably in weight, stiffness, size, material, age, friction, fuser oil or other surface coatings, folds, curls, tears, smearable typing or printing, or other conditions. They may even have sprocket or binder holes. Yet document handlers must reliably overcome various, and often conflicting, requirements for reliable and timely document feeding and registration, with minimal document or platen glass wear, and without damage to valuable originals. The document normally must be initially transported quickly without substantial skew or slippage, then rapidly stopped in a desired or defined imaging position, usually with at least one edge of the document aligned with at least one edge of the platen, and then quickly reaccelerated after copying to eject the document from the platen into a restacking tray. In a recirculating document handler (RDH) for precollation copying the same documents must be repeatedly sequentially recirculated by being repeatedly restacked, reseparated, refed and recopied.

Even for smaller, lower cost, and slower copiers, it has become increasingly desirable to provide such mechanized or automated handling of documents. The documents may be automatically separated and sequentially fed from a stack of documents, or fed semiautomatically by an operator "stream feeding" individual documents into an input area of the document handler. In either case the document handler automatically does the final feeding and registration of the documents into and through the copying position, and then ejects the documents automatically. However, in such compact and low cost copiers, an appropriate document handler should also be simple, very low cost, lightweight and compact.

A document handling system preferably utilizes the existing or generally conventional copier optical imaging system of the copier on which it is mounted, including the external transparent copying window (known as the platen) of the copier. It is also desirable that a document handling system be readily removable, e.g., that it can be pivoted away from the platen by the operator, to allow the operator to manually place selected documents, such as books, on the same platen. A low mass document handler makes this lifting movement easier and safer, and reduces the need for counter-balancing springs.

A document handling system should provide a suitable white imaging background surface platen cover member overlying the platen against which documents can be copied without serious "show-through" or "show-around" copy defects (undesirable images from the document handler on the copy sheets). A document handling system should also flatten the document against the platen and thus maintain it in focus and provide uniform and undistorted copying. However, a suitably small space rather than direct contact may be desirable in some cases, to allow for document feeding, e.g., U.S. Pat. No. 3,888,581 issued June 10, 1975 to John R. Caldwell.

The appropriate type of document transport and registration system is affected by the type of copier optics. In either a scanning (moving) optics system, or a full frame or flash imaging system, the platen is stationary, and the entire area to be copied must overlie the platen during copying and the document must be held stationary against the platen during copying. The size and complexity of even a simple fixed platen copier document feeder is shown, for example, in U.S. Pat. No. 4,420,149 issued Dec. 13, 1983 to M. Schultes et al.

In a moving platen system the document is copied while the document is being moved. The document moves past a stationary optics (including illumination) system at a constant speed synchronized to the photoreceptor imaging surface speed. In a moving platen copier the entire platen is moved, then reversed in a higher speed return or "flyback" movement before the next copying movement. One example of a platen drive system for a moving platen copier is illustrated in U.S. Pat. No. 4,190,349 issued Feb. 26, 1980 to Y. Ohno, et al. A moving platen system allows a low cost copier imaging system, but hitherto has interfered with automatic document feeding and placement. It has hitherto generally also been necessary in a moving platen system to preregister the document relative to the platen before the document is transported over the copying window.

It is important to distinguish a moving platen system from a CVT system. In a CVT system the document sheet is moved by transport wheels or belts at a constant velocity over a narrow transparent scanning window or platen of the copier. CVT systems can have particular problems in maintaining a sufficiently accurate constant speed of the document with variations in document thickness, variations in deformable document feed roller diameters, or variations in frictional resistance to feeding between the document, the document feed rollers, and the platen glass. CVT systems can also have problems with wear or scratching of the platen glass from the documents or the feed rollers. Also, a CVT system does not allow alternative fully manual handling of the document, which is particularly desirable for valuable or delicate documents. CVT and other fixed platen document feeders can also have generated static electricity platen attraction and other document feeding problems, as discussed for example in U.S. Pat. No. 4,440,387 to ikoma et al.

In a CVT document feeder the document sheet, regardless of its above-noted variations, must be forced to slide without lifting across a small stationary glass platen or slit at a constant velocity throughout the entire imaging of the document in order to provide proper imaging. This is in contrast to a moving platen copier, in which the document may be held down stationarily against a full size flat glass platen unit, in a protective "sandwich", and that rigid, and much higher mass, platen unit is (more easily) transported at a constant velocity relative to the imaging station for imaging.

It is also known to provide a copier with more than one mode of document transporting, for example, to provide a recepticle in the nature of a moving platen for thick material such as books which can be driven by the same transport drive system which alternatively provides for constant velocity transporting of a normal document sheet, as exemplified by U.S. Pat. No. 4,530,591 issued July 23, 1985 to T. Mastuyama et al. A CVT with an alternative book carrier "platen", with rack and pinion drive, is also disclosed for example in Japanese Utility Model Application No. 54-15480 laid open June 18, 1981 as No. 56-74455, by Olympus Optical. A CVT system can also be combined into a copier alternatively providing a full size stationary platen. Alternative CVT "stream feeding" input, especially useful for feeding and imaging documents which are larger than the platen, is provided, for example, in the Xerox Corporation "3100 LDC" copier (see, e. g., U.S. Pat. Nos. 3,900,258 and 4,017,172).

Of particular interest to the present invention is the following art, relating to previous attempts to provide some sort of document feeding or transporting for moving platen copying machines. As noted in European Patent Application Publication No. 0 145 045 published June 19, 1985, based on U.S. Ser. No. 542,289 filed Oct. 14, 1983 by J. C. Hamma (Gradco Systems, Inc.), original document feeders have not, in general, been applied to moving platen copying machines. It may be readily seen that the feeder proposed in this reference is more complex than the present system. Two other references noted as to document feeding for moving platen copiers are IBM Corporation U.S. Pats. Nos. 4,367,947 issued Jan. 11, 1983 to N. K. Arter et al and 4,368,977 issued Jan. 18, 1983 to N. K. Arter et al. The later patent 4,368,977 is particularly noted for a document ejecting roller driven by movement of the carriage by power stored from carriage movement. Another example of semiautomatic document feeder for a moving platen copier is the Canon NP-155F document feeder product. A document handling device for a moving platen copier for photocopying documents such as billing statement ledger cards from a stack of such documents is disclosed in U.S. Pat. No. 4,068,949 issued Jan. 17, 1978 to R. A. Booth et al.

U.S. Pat. No. 4,429,866 issued Feb. 7, 1984 to V. Castro-Hahn, is noted for its rack and pinion rotating and translating document feed roller movement, and also for the disclosed wrapped wire or cord drive. However, this is for a constant velocity transport (CVT) copier in which the original document sheet is transported for copying by being slid over the glass of a fixed imaging station by this rotation and movement of the rollers.

The present invention is not limited to a particular or specific type of document illumination or optics system. However, it is particularly suitable for providing a simple, low cost, compact and light weight document transport for a moving platen type copier, which has heretofore been difficult, and commercially uncommon.

In a moving platen type copier, the movement of the platen unit precludes or interferes with the operation of a conventional stationary document feeder. A conventional feeder would be too large and heavy to easily, reliably, or safely move reciprocally with the moving platen unit, especially with the added weight of a document feeder drive motor. The added mass of a document feeder which moves with the moving platen unit could be expected to put an unacceptable acceleration and deceleration load upon the drive system for the moving platen. A moving platen copier must accelerate the moving platen unit rapidly to a constant velocity and then decelerate rapidly at the end of the copying movement. The moving platen copier must then rapidly reverse the movement of the platen unit and move it back, at a much higher "flyback" speed, to its original position, rapidly stop the platen unit again, and then begin the scan for the next document or for the next copy of the same document, all as rapidly as possible. The added mass of a document feeder not only could interfere with these movements, it could actually cause uneven imaging movement of the platen unit, slippage or damage to the drive clutches, or even damage or wear to the platen unit drive. Uneven imaging movement of the platen unit would cause distortion of the image on the copy.

It may be readily seen that the document feeder disclosed herein, as compared to various of the references, is much more compact and lighter. It is especially adapted for a document feeding unit to be mounted on, as a portion of, a moving platen unit copier.

It is a general feature of the document handling system disclosed herein to provide a document platen transport and registration system for use with a moving platen copier which overcomes various of the abovediscussed problems, and combines various desirable features in a very simple, economical and lightweight system providing reliable document feeding, registration, and protection.

A feature of the specific embodiment disclosed herein is to provide, in a copier with a moving platen document imaging system, wherein the platen is a part of a movable platen unit reciprocally driveable relative to the stationary body of the copier for imaging a document in an imaging movement of the moving platen unit while the document is on and moving with the platen unit and with the document being imaged by the copier, the improvement comprising:

an automatic document feeder for automatically feeding documents on to and off of said platen solely utilizing said reciprocal movement of said moving platen unit, said document feeder including:

rotatably driveable document feeding means mounted to said moving platen unit for reciprocal movement therewith but rotatable relative to said platen for movement of documents relative to said platen;

motion converting means for converting said reciprocal motion of said moving platen unit in at least one direction of movement thereof into appropriate intermittent rotation of said document feeding means;

said motion converting means comprising stationary means for generating motion mounted to said stationary body of said copier, and mechanical interconnecting means interconnecting said stationary motion generating means to said document feeding means on said moving platen unit, for intermittently rotatably driving said document feeding means at a document feeding velocity substantially different from the reciprocal movement velocity of said moving platen unit, so as to feed a document on to and over said platen while said platen is reciprocally moving, said document feeding means being driven solely by said motion-converting means;

and means for automatically disengaging said document feeding means from said motion converting means during said imaging movement of said moving platen unit for holding a document on said platen without relative movement between the document and said platen during said imaging movement.

Further features provided by the system disclosed herein, individually or in combination, include those wherein:

said means for automatically disengaging said document feeding means from said motion converting means is an automatically activated clutch;

and/or wherein said stationary motion generating means comprises an elongated toothed rack stationarily mounted to said stationary body of said copier parallel to the directions of movement of said moving platen unit, and wherein said mechanical interconnecting means comprises a gear on said moving platen unit normally engaging said rack;

and/or wherein said moving platen unit also has a preimaging movement and a return (flyback) movement, and wherein the engagement of said document feeding means with said motion-converting means is during said return (flyback) and/or preimaging movement of said moving platen unit;

and/or wherein said moving platen unit also has a preimaging movement and a return (flyback) movement, and wherein the document is automatically fed onto the platen during said preimaging movement of said moving platen unit and is automatically ejected from said platen during said return (flyback) movement of said moving platen unit;

and/or wherein said means for automatically disengaging said document feeding means from said motion connecting means is an automatically activated clutch;

and/or wherein the document is automatically fed onto the platen during said preimaging movement of said moving platen unit and is automatically ejected from said platen during said return (flyback) movement of said moving platen unit.

Some examples of various other prior art copiers with document handlers, and especially with control systems therefor, including document sheet detecting switches, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, and 4,475,156. It is well known in this art, and in general, how to program and execute document handler and copier control functions and logic with conventional or simple software instructions for conventional microprocessors. This is taught by the above and other patents and various commercial copiers. Such software may vary depending on the particular function and particular microprocessor or microcomputer system utilized, of course, but will be available to or readily programmable by those skilled in the applicable arts without experimentation from either descriptions or prior knowledge of the desired functions together with general knowledge in the general software and computer arts. It is also known that conventional or specified document handling functions and controls may be alternatively conventionally provided utilizing various other known or suitable logic or switching systems.

All references cited in this specification, and their references, are incorporated by reference herein where appropriate for appropriate teachings of additional or alternative details, features, and/or technical background.

The present invention overcomes or reduces various of the abovenoted and other problems discussed in said references.

Various of the above-mentioned and further features and advantages will be apparent from the specific apparatus and its operation described in the examples below. The present invention will be better understood by reference to this description of these embodiments thereof, including the drawing figures (approximately to scale), wherein.

Figure 7:
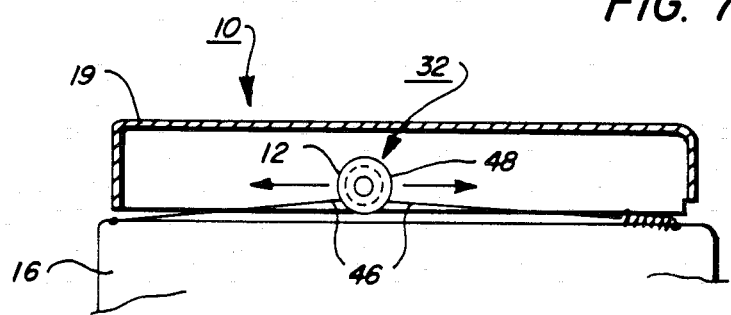

FIGS. 3–6 are simplified top perspective views thereof, illustrating the different stages of document feeding and corresponding platen movement for, respectively, initial loading of a document sheet into the feeder at the "home" position, automatic feeding of the document onto the platen as it moves into the start of scan (copying) position, the end of scan (copying) position, and completed document ejection during "flyback"; and FIG. 7 is a partial rear view illustrating an alternative embodiment differing only in the document feeder drive input (where the copier rack and feeder pinion drive of the FIGS. 1–6 embodiment is replaced by a wrapped wire or string drive, as further explained hereinbelow).

Figure 1:
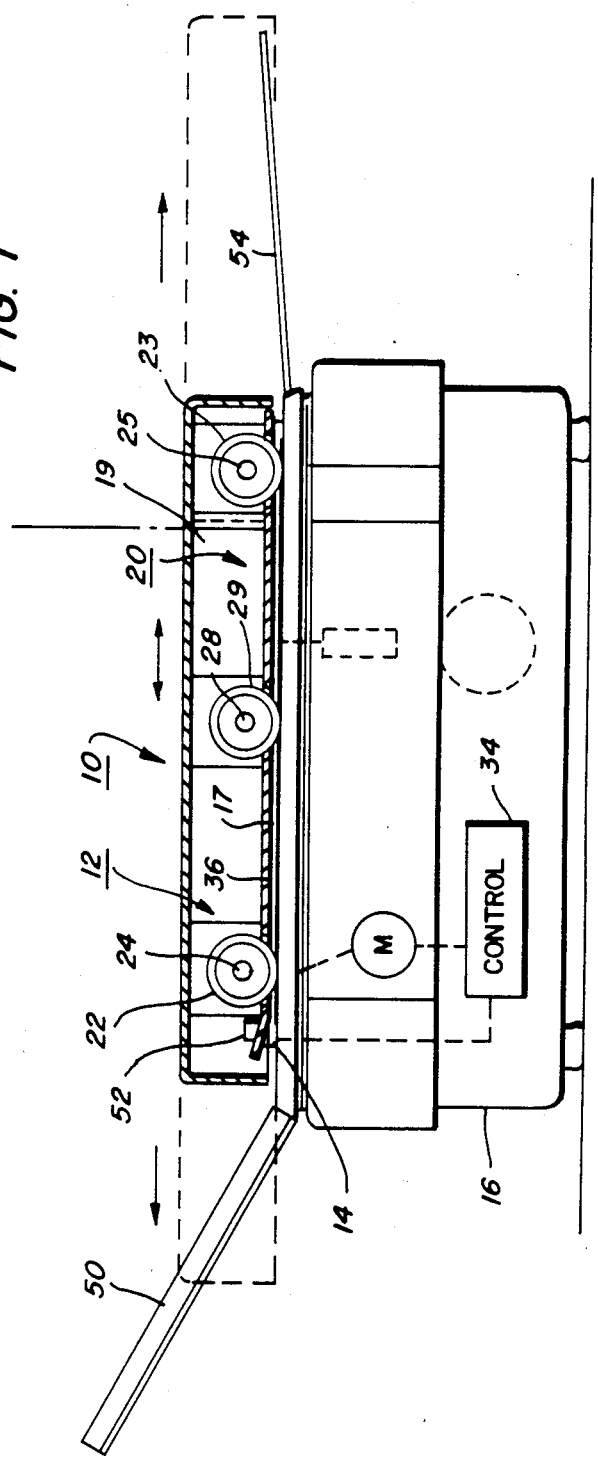
FIG. 1 is a front view of one example of a document handler and its associated combined exemplary commercial moving platen xerographic copier, in accordance with the present invention.

Describing now in further detail the specific examples illustrated in the Figures, there is shown the relevant details of a new and improved document handling system 10, and in particular the novel document platen transport system 12 thereof, for sequentially transporting document sheets onto and over the moving platen 14 of a conventional moving platen copier 16. This platen transport system 12 is also adapted to automatically register each document sheet 17 at an appropriate registration position on the platen 14 of the moving platen unit 19. Registration is provided by an integral registration system 20 for engaging, stopping and deskewing, without damage, the lead edge of each document sheet 17 at the appropriate registration position on the platen 14. The moving platen unit 19 includes a conventional platen 14 and the conventional slide bearings and frictional track or toothed rack means for being reciprocally driven from and over the stationary body of the copier 16. In FIG. 1 the rest or "home" position of the platen unit 19 is shown in solid lines, the "start of scan" position of this particular copier 16 is shown by the dashed-line position to the left thereof, and the end of scan or start of "flyback" position is shown by the dashed-line position to the right thereof.

The document handling system 10 and its platen transport system 12 illustrated here are exemplary, and may be readily modified for different moving platen copiers, including those with different platen unit motions than the exemplary copier 16 here. The exemplary copier 16 here is the well known "Canon PC-20" TM (or "PC-10" or "PC-25") small xerographic copier. It is illustrated in, for example, U.S. Pat. No. 4,540,268 issued Sept. 10, 1985. Since the document handling system 10, or parts thereof, may be readily utilized with other conventional or appropriate moving platen copiers, the details of the copiers per se need not be described herein.

It will also be appreciated that the document handling system disclosed herein may be variously utilized as or incorporated into a semiautomatic, fully automatic (stack fed), and/or recirculating document feeder, of which various examples have been provided in the references cited above, and their references.

Here, the moving platen unit 19 additionally includes the document handling system 10, which is mounted thereon and moves therewith. The entire document handling system 10 is preferably pivotably (and removably) mounted by a disconnectable gear hinge to the rear of the platen unit 19, so that it may be lifted up to provide manual document placement on, and access to, the platen 14. The exemplary platen transport system 12 here has two sets of rollers 22 and 23 on two shafts 24 and 25 extending over the platen 14 transverse its directions of movement. They are respectively spaced adjacent the upstream and downstream ends of the platen 14. Both of these shafts 24 and 25, and therefore their rollers 22 and 23, are mounted to, and therefore moved with, the moving platen unit 19. As will be described, the shafts 24 and 25 are intermittently rotatably driven. Yet this driving is solely by the normal reciprocal motion of the platen unit 19 as it is conventionally driven by the conventional platen unit drive "M" in the copier 16. So is an additional central shaft 28 and its roller 29, optionally provided, which particularly assists the feeding of smaller documents. It will also be appreciated that more than one roller may be utilized on one or more of these roller shafts. There are no modifications required for the conventional copier platen 14 or the conventional platen unit 19 drive "M". There are no changes required in the conventional motions of the moving platen unit 19.

The platen transport system 12 also preferably includes a white backing or imaging surface member 36 defined by a rigid plate mounted closely overlying, but spaced from, the upper surface of the platen 14, sufficiently spaced to allow the documents to be moved as described therebetween. This serves in lieu of the conventional platen cover to hold the documents to within the depth of focus of the copier optics, yet allows their movement when the document feed wheels are being rotated. Rollers 22, 23, and 29 extend down through corresponding holes in the surface member 36 into engagement with the platen 14. The shafts and other elements of the document driving system may be mounted on top of this surface member 36. The surface member 36 and these components thereon are hidden under an enclosing connecting cover, as in FIG. 1, but this cover is removed (not shown) in FIG. 2 for illustrative clarity.

Figure 2:
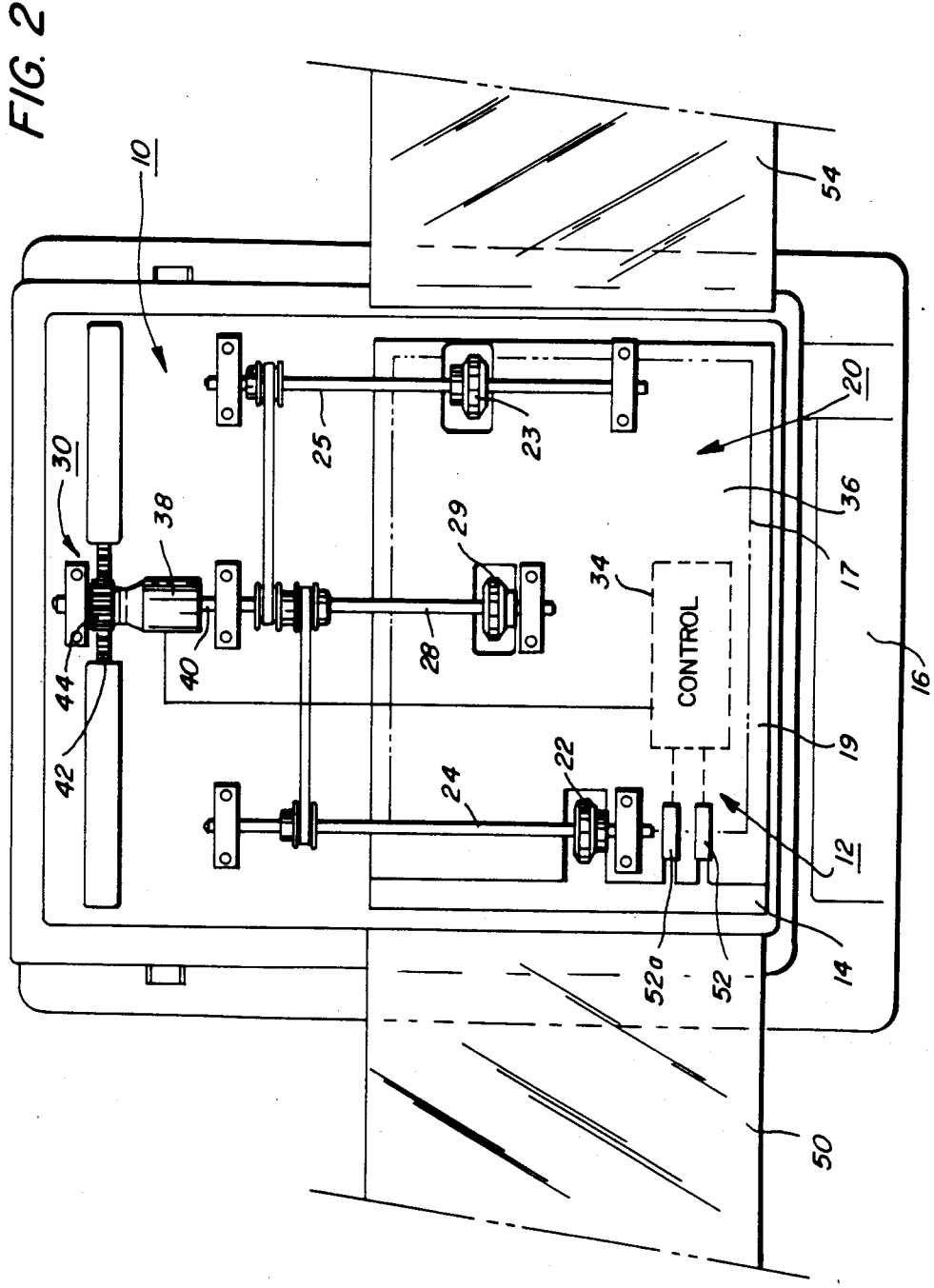
FIG. 2 is a top view thereof (without an external cover, for clarity)
Figure 3:
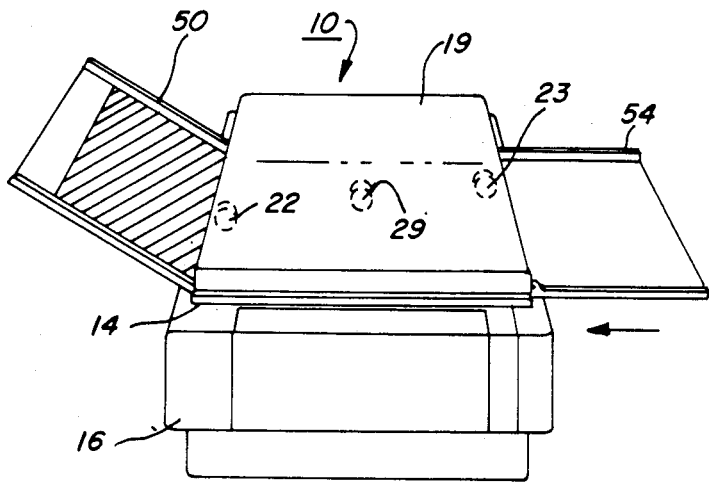
Figure 4:
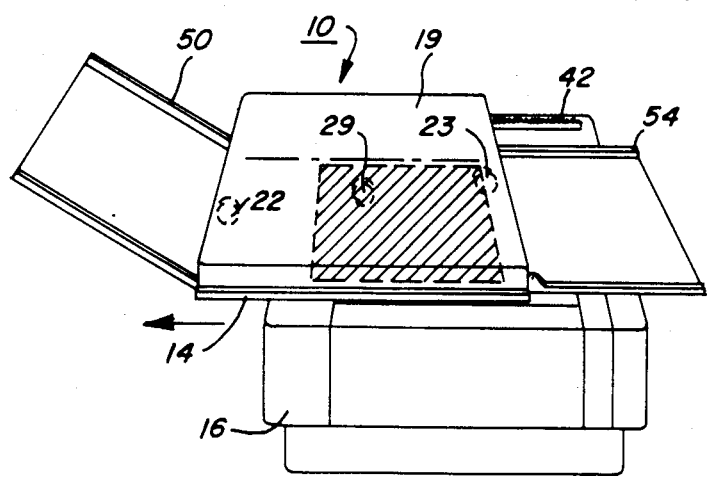
Figure 5:
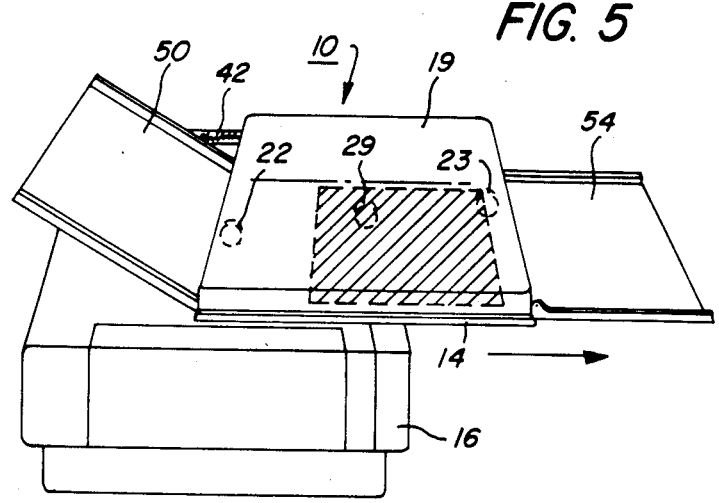
Figure 6:
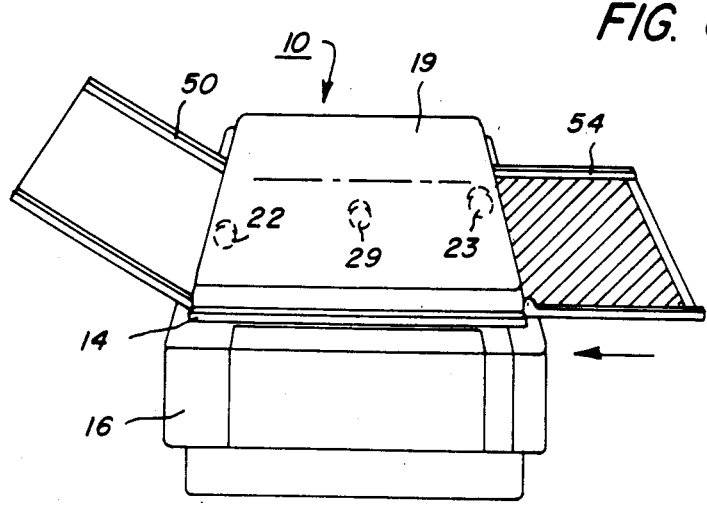

All power for the document feeding and document registration is provided in the platen transport system 12 by a motion converting system connecting between the stationary body of the copier 16 and the moving platen unit 19. No separate drives or motors are required, thus saving moving mass, space and complexity. Two examples of the motion converting system disclosed herein are the rack and pinion drive coupling 30 in the FIGS. 1-6 embodiment, shown in FIG. 2, and the frictional looped cable drive 32 shown in the FIG. 7 embodiment. These two systems are otherwise identical. They may be clutched in at selected times to the two shafts 24 and 25 with an electrical signal from a simple electrical control 34 (which may be a part of the conventional copier control). The motion converting system is selectively electrically clutched in with this signal by a small conventional electromagnetic clutch 38 on an input shaft 40, as illustrated in FIG. 2 for example. As shown, the input shaft 40 is rotatably driven when electromagnetic clutch 38 is engaged to rotate the pulleys thereon which interconnect by conventional small drive belts to other pulleys on the two shafts 24 and 25. The respective pulley diameters may be selected to provide selected, and different, rotational speed differences from shaft 40, if desired. Here, optionally, shaft 40 has an integral extension to provide and drive central shaft 28 and its central roller 29.

In the rack and pinion drive coupling 30, a toothed rack 42, which may be a segment of a commercial plastic timing belt, is glued or otherwise fastened along the rear top surface of the stationary body of the copier, behind but parallel to the platen unit 19. The rack 42 thus does not ever move here. When the platen unit 19 is in its normal, lowered, position, a correspondingly toothed pinion gear 44 engages the rack 42. Pinion gear 44 is rotatably connected to the electromagnetic clutch 38 and is fastened to and moves with the platen unit 19. Thus the motion of the platen unit 19 directly and proportionally rotates (by the rolling connection to rack 42) the pinion gear 44, in proportion to the effective gear diameter of the pinion gear 44. An alternative to the rack and pinion would be a high friction surface engaged by a high friction roller.

In the alternative motion converting system of the looped cable drive 32 in the FIG. 7 embodiment, a plastic cord or metal wire 46 is fastened at its opposite ends adjacent to respective opposite ends of the stationary copier body, preferably with spring loading or tensioning as shown. This wire 46 is intermediately wrapped in a nonslipping manner around a pulley 48, which may be mounted and otherwise rotatably driven in the same basic manner as pinion gear 44. Thus, as the platen unit 19 moves, the wire 46 forces the pulley 48 to rotate.

The electromagnetic clutch 38 here also operates as a one-way drive clutch by only being actuated to engage during one direction of platen motion. (Alternatively, it may have an integral or connecting mechanical one-way clutch, such as a conventional wrapped-spring or ratchet clutch, and see below re alternative single copy operation.) This provides for rotation of input shaft 40 by the above-described motion-converting system in only one direction of movement of the platen unit 19, and provides automatic disengagement of the driving of the platen transport system 12 during the reverse direction of movement of the platen unit 19. This one-way clutch disengagement occurs in the imaging movement direction and said engagement occurs during the initial and flyback movement direction.

Briefly, in both said embodiments here, as the platen unit 19 makes its initial movement, which for this copier 16 is from its "home" position out to the "start of scan" position, the document is acquired by the first or upstream roller 22 and rapidly pulled out of the input tray 50 (or the operator's hand) and automatically driven onto and over the platen 14 by a total distance which brings it up to the registration position. Here that is at or adjacent the last or downstream roller 23. This document feeding movement is desirably at twice or slightly faster than twice the speed of the moving platen unit 19, so that the document sheet is fully fed onto the platen by the end of the total initial movement of the platen in that same direction of platen unit motion, because for this particular copier 16 the initial movement of the moving platen unit 19 is approximately one-half the imaging area dimension of the platen 14. This initial document feeding may be assisted by the central roller 29 being commonly driven.

Then, during the next reverse, (the scanning or imaging) movement of the platen unit 19, scanning imaging of the document 17 on the platen 14 takes place with no movement of the document 17 relative to the platen 14, i.e., with all document drive shafts 24, 25 and 28 disengaged from the motion converting drive system and therefore with no rollers 22, 23, or 29 being rotated. If more than one copy was selected (by the conventional copier copy count selector), the controller 34 keeps the electromagnetic clutch 38 disengaged until all the selected number of copies have been made. Thus, repeated scanning and flyback cycles can be made without removing and replacing the document. When the last selected copy has been made and the platen unit 19 motion reverses again (i. e., during its last "flyback" movement), all the rollers, especially the downstream shaft 25 and thus its roller 23, are not engaged, to rapidly rotate and eject the document from the platen 14.

Note that after the last copy, the "flyback" movement of the platen unit 19 is only to the "home" position rather than back to the start of scan position. The document ejection drive distance is based on that movement distance.

The roller 23 may be stalled (nonrotating) during the initial feeding time period and platen movement by electrical drag braking or by disengagement from the drive system so as to to serve as the registration system 20, by providing a document stopping gate and defining the leading edge registration position for the document sheet 17 on the platen 14. In this case the roller 23 should be a wide roller extending across the platen or two or more spaced-apart rollers on this same shaft to register the document against at least two points.

The above-noted use of a stalled downstream roller or rollers 23 for lead edge registration and some deskewing (rather than depending entirely on the total distance the rollers 22 and 29 are driven in one movement of the platen unit 19) is optional. As noted, this distance can be controlled other than just by gear or wheel ratios. For example, it may be controlled by electrical clutch 38 disengagement before the end of the platen motion. Other options are shortening, or providing a gap in, the rack 42. As noted, the center roller 29 can be eliminated, but then smaller (undersized) documents cannot be fed.

It may be seen that the transverse position of the input roller 22 is not exactly centered relative to the document. It is preferably spaced slightly more than one-half the normal document width away from the copier's conventional document side edge registration guide extending along the rear of the platen so as to tend to slightly skew the document towards that registration guide as it is being fed in. This also accommodates variations in document widths. Skewing of the rollers may also be provided, as by slightly skewing the shaft positions.

The total circumferential distance movement of the input drive wheel or roller 22 should be sufficient to move the document from the edge of the platen into its copying (registered) position on the platen. Here this is equal to or greater than the distance of travel of the platen in its first movement. The distance between the input drive roller 22 and the ejection roller 23 should be approximately or slightly less than the length of the conventional size document to be fed to maintain positive control over the document. For complete or positive ejection from the platen of individual sheets, the exit or ejection roller 23 is preferably driven up to 50% faster than the other drive rollers, and by a total circumferential distance greater than the length of the largest document to be fed. This ejection may be into an output stacking tray 54 at the downstream end of the platen. The middle roller 29 may be run slightly faster than the upstream roller 22.

The particular design parameters for the pinion or pulley and roller diameters may be readily selected for the particular copier and document and/or scan distance. For example, with this particular copier 16, which initially moves in a 5.5 inch (14 cm.) prescan movement, and for standard 11 inch (28 cm.) long documents fed lengthwise (short edge first), (a 28/14 or 2/1 ratio), an equal 2/1 ratio of the diameter of the drive rollers to the spur or pinion gear 44 pitch diameter may be provided by, respectively, 31 mm. and 15.5 mm. diameters.

The controller 34 may be a simple on-off or "and" circuit or switches, connected, for example with the input document sensing switch 52 and the existing "start" signal circuit and the zero copy count counter display or job end logic circuit of the copier (the signal indicating that no selected copies remain to be copied). The input document sensing switch 52, or another separate switch 52a in that same general position, is preferably connected in electrical parallel with the existing "start" switch on the copier so as to automatically start the copier and actuate the clutch 38 of the feeder merely in response to a document being inserted, without need for the operator to actuate the "start" switch on the copier, but equally responsive to that also. The clutch 38 preferably engages before the platen starts to move, which occurs inherently since it operates faster than the drive "M" if they are both actuated at the same time. An alternative to the controller 34 would be switches actuated by the respective movements of the platen unit by appropriate positioning in the paths thereof. Alternatively, the motion reversal signal to the platen drive "M" or its clutch, if it has one, can be tapped directly to control the clutch 38.

The initial actuation of the platen transport system here 12 is by a lead edge area of the document occluding an upstream document sensor 52.

If it is acceptable to operate the copier and document feeder in a single copy mode, i. e., to make only one copy of each document sheet, or to represent it for each additional copy, then the clutch 38 may be simply a one-way automatically mechanically actuated clutch, such as a conventional wrapped-spring or ratchet clutch, with no need for any electrical actuation or deactuation and no need for any control circuitry.

With the particular exemplary moving platen copier 16 identified herein, there is an initial prescan movement of the moving platen unit 19, which is utilized.

This is an initial movement of the moving platen unit 19 from its "home" position (where it is aligned over the body of the copier) to an upstream "start of scan" position. Since this movement is in the same movement direction as the postscan "flyback" movement, the same one-way clutch 38 engagement can be utilized to drive the document feed rollers and feed a document onto the platen from an input tray 50 during and with this movement.

If desired, the next document to be copied may be fed onto the platen simultaneously with the feeding off of the preceding document.

Conventional individual document sheets are illustrated as being sequentially fed and registered, and a wide variety of sizes can be handled. However, with a slight modification, the same feeder can even operate as a CFF feeder, to feed a continuous web document such as computer form fanfold web. In this case the downstream roller 23 would not be stopped to provide registration. Registration of the web can be by sequentially feeding one desired web segment length at a time, after the selected number of copies have been made of the prior segment. This can be done by selecting the distance the rollers drive the web on flyback, and/or the length of time the electrical engagement signal from controller 34 is applied to the electromagnetic clutch 38. The web segment advancing distance can be preset mechanically as described elsewhere herein, or timed electrically. Or, it can be accomplished by photoelectrically counting sprocket holes in the web as it moves and disengaging clutch 38 after a preselected hole count. This CFF feeding can be initiated as a switch-selectable option by the operator, or can even be automatically initiated by the input document sensor 52 sensing the presence of an over-long document by still being occluded after the first document ejection cycle, (since it would normally then not be for a normal size document).

In conclusion, the document handling system 10 may be constructed and operated at very low cost. It is very light in weight, and therefore does not overload a conventional platen unit drive. It does not require any separate power source or motors. It is easily pivotably mounted over a conventional copier platen so that it can be lifted away from the platen for alternative manual document placement, registration and copying or removal completely. It can provide reliable automatic feeding of documents in rapid sequence, closely spaced from one another, at the full copying rate of the copier. It allows multiple copies to be made of a selected document sheet without requiring the refeeding and reregistering of the document sheet to be recopied. It provides reliable and accurate registration with protection from document damage. It does not introduce significant "show-around" or "show-through" copy defects. It provides easy jam access and clearance. Thus, it is uniquely suitable for small, low cost, moving platen copiers, for which low cost automatic document handling was heretofore not practicably available.

While the embodiments disclosed herein are preferred, it will be appreciated from this teaching that various alternatives, modifications, variations or improvements therein may be made by those skilled in the art, which are intended to be encompassed by the following claims.

What is claimed is:

1. In a copier with a moving platen document imaging system, wherein the platen is a part of a movable platen unit reciprocally driveable relative to the stationary body of the copier for imaging a document in an imaging movement of the moving platen unit while the document is on and moving with the platen unit and with the document being imaged by the copier, the improvement comprising:
   an automatic document feeder for automatically feeding documents on to and off of said platen solely utilizing said reciprocal movement of said moving platen unit, said document feeder including:
   rotatably driveable document feeding means mounted to said moving platen unit for reciprocal movement therewith but rotatable relative to said platen for movement of documents relative to said platen;
   motion converting means for converting said reciprocal motion of said moving platen unit in at least one direction of movement thereof into appropriate intermittent rotation of said document feeding means;
   said motion converting means comprising stationary means for generating motion mounted to said stationary body of said copier, and mechanical interconnecting means interconnecting said stationary motion generating means to said document feeding means on said moving platen unit, for intermittently rotatably driving said document feeding means at a document feeding velocity substantially different from the reciprocal movement velocity of said moving platen unit, so as to feed a document on to and over said platen while said platen is reciprocally moving, said document feeding means being driven solely by said motion-converting means;
   and means for automatically disengaging said document feeding means from said motion converting means during said imaging movement of said moving platen unit for holding a document on said platen without relative movement between the document and said platen during said imaging movement.

2. The copier of claim 1 wherein said means for automatically disengaging said document feeding means from said motion converting means is an automatically activated clutch.

3. The copier of claim 1 wherein said stationary motion generating means comprises an elongated toothed rack stationarily mounted to said stationary body of said copier parallel to the directions of movement of said moving platen unit, and wherein said mechanical interconnecting means comprises a gear on said moving platen unit normally engaging said rack.

4. The copier of claim 1 wherein said moving platen unit also has a preimaging movement and a return (flyback) movement, and wherein the document is automatically fed onto the platen during said preimaging movement of said moving platen unit and is automatically ejected from said platen during said return (flyback) movement of said moving platen unit.

5. The copier of claim 1 wherein said moving platen unit also has a preimaging movement and a return (flyback) movement, and wherein the engagement of said document feeding means with said motionconverting means is during said return (flyback) and/or preimaging movement of said moving platen unit.

6. The copier of claim 5 wherein said means for automatically disengaging said document feeding means form said motion connecting means is an automatically activated clutch.

7. The copier of claim 6 wherein the document is automatically fed onto the platen during said preimaging movement of said moving platen unit and is automatically ejected from said platen during said return (flyback) movement of said moving platen unit.

8. In a document handling system for a copier with a moving platen imaging system, wherein the imaging platen of the copier is integral with a moving platen unit reciprocally driven relative to the stationary body of the copier in a non-imaging movement and an imaging movement, for imaging a document sheet on said platen moving with said platen during said imaging movement at a stationary scanning imaging station underlying said platen, the improvement comprising:

an automatic document feeder for automatically feeding documents on to and off of said platen solely utilizing said reciprocal movement of said moving platen unit, said document feeder including;

rotatably driveable document feeding means mounted to said moving platen unit for reciprocal movement therewith but rotatable relative to said platen for movement of documents relative to said platen;

motion converting means for converting said reciprocal motion of said moving platen unit in at least one direction of movement thereof into appropriate intermittent rotation of said document feeding means;

said motion converting means comprising stationary means for generating motion mounted to said stationary body of said copier and mechanical interconnecting means interconnecting said stationary motion generating means to said document feeding means on said moving platen unit, for intermittently rotatably driving said document feeding means at a document feeding velocity substantially different from the reciprocal movement velocity of said moving platen unit, so as to feed a document on to and over said platen while said platen is reciprocally moving in said nonimaging movement, said document feeding means being driven solely by said motion-converting means;

and means for automatically disengaging said document feeding means from said motion converting means during said imaging movement of said moving platen unit for holding a document on said platen without relative movement between the document and said platen during said imaging movement.

9. The copier of claim 8 wherein said means for automatically disengaging said document feeding means from said motion converting means is an automatically activated clutch.

* * * * *